(12) United States Patent
Tamei et al.

(10) Patent No.: US 11,835,439 B2
(45) Date of Patent: Dec. 5, 2023

(54) SENSOR DEVICE HAVING AN ELEMENT COVER INCLUDING INNER AND OUTER COVERS

(71) Applicant: DENSO CORPORATION, Kariya (JP)

(72) Inventors: Yuto Tamei, Kariya (JP); Koichi Yoshida, Kariya (JP); Takehito Kimata, Kariya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 17/407,284

(22) Filed: Aug. 20, 2021

(65) Prior Publication Data

US 2021/0381945 A1 Dec. 9, 2021

Related U.S. Application Data

(63) Continuation of application No. PCT/JP2020/003163, filed on Jan. 29, 2020.

(30) Foreign Application Priority Data

Feb. 21, 2019 (JP) .................................. 2019-029816

(51) Int. Cl.
*G01N 15/06* (2006.01)
*G01M 15/10* (2006.01)

(52) U.S. Cl.
CPC ...... *G01N 15/0656* (2013.01); *G01M 15/102* (2013.01)

(58) Field of Classification Search
CPC ............ G01N 15/0656; G01N 15/102; G01N 27/4077; G01N 2015/0046; G01N 15/0606
See application file for complete search history.

(56) References Cited

U.S. PATENT DOCUMENTS

| | | | | |
|---|---|---|---|---|
| 2005/0016849 A1* | 1/2005 | Ikoma | ................. | G01N 27/4077 204/429 |
| 2016/0153814 A1* | 6/2016 | Seimori | ............. | G01N 27/4077 73/431 |
| 2017/0131185 A1 | 5/2017 | Koike et al. | | |
| 2018/0252671 A1* | 9/2018 | Araki | ................. | G01N 27/4067 |

FOREIGN PATENT DOCUMENTS

| | | |
|---|---|---|
| JP | 2000-171430 | 6/2000 |
| JP | 2001-74686 | 3/2001 |
| JP | 2006-292609 | 10/2006 |

OTHER PUBLICATIONS

International Search Report dated Mar. 10, 2020 issued in International Application No. PCT/JP2020/003163 (2 pages).

* cited by examiner

*Primary Examiner* — David Z Huang

(74) *Attorney, Agent, or Firm* — Nixon & Vanderhye P.C.

(57) ABSTRACT

A sensor device includes a housing that has a sensor element inserted therein and holds the sensor element such that a detection unit is positioned at the tip end thereof in the axial direction, and an element cover disposed coaxially with the tip end. A tip surface of the outer cover has a plurality of outer tip surface holes provided outward from positions opposing the outer periphery of an inner tip surface hole. The tip surface of the outer cover includes a central portion which protrudes towards the inner tip surface hole, an outer peripheral portion in which the outer tip surface holes are formed and which is positioned farther toward the tip end than is the central portion, and an inclined surface connects the central portion to the outer tip surface holes.

7 Claims, 11 Drawing Sheets

SENSOR DEVICE HAVING AN ELEMENT COVER INCLUDING INNER AND OUTER COVERS

CROSS-REFERENCE TO RELATED APPLICATION

This application is the U.S. bypass continuation application of International Application No. PCT/JP2020/003163 filed on Jan. 29, 2020, which designated the U.S. and claims priority to Japanese Patent Application No. 2019-029816, filed on Feb. 21, 2019, the contents of both of which are incorporated herein by reference.

TECHNICAL FIELD

The present disclosure relates to a sensor device for detecting specific components in a gas that is under measurement.

BACKGROUND

In an exhaust gas purification system, a sensor device for detecting a specific component in exhaust gas, and a purification device such as a filter device or a catalyst device, are provided in the exhaust gas passage of an internal combustion engine. The sensor device is, for example, a particulate matter sensor for detecting particulate matter (referred to in the following as PM when appropriate), which is located downstream from a filter device that collects PM, and is used in judging whether filter failure occurs. Furthermore, an exhaust gas sensor such as an oxygen sensor is disposed upstream or downstream from the catalyst device.

SUMMARY

The present disclosure provides a sensor device including:
a sensor element having a detection unit for detecting a specific component in a gas under measurement,
a housing having a sensor element inserted into the interior thereof, retained with a detection unit positioned at the tip end of the sensor element with respect to the axial direction, and
an element cover disposed at the tip end of the housing coaxially,
with the element cover including an inner cover disposed such as to cover the tip end of the sensor element and an outer cover disposed with a space between the outer cover and the outer periphery of the inner cover; wherein
an inner side hole and an inner tip surface hole, through which the gas under measurement circulates, are provided in a side surface and a tip surface respectively of the inner cover;
a plurality of outer side holes, through which the gas under measurement circulates, are provided in a side surface of the outer cover, with the tip positions of the outer side holes being located farther toward the tip end of the sensor device than is the tip position of the inner cover;
a plurality of outer tip surface holes are provided in the tip surface of the outer cover, located farther outward than positions facing the outer periphery of the inner tip surface hole;
in the tip surface of the outer cover, a central portion which faces the inner tip surface hole protrudes towards the inner tip surface hole, an outer peripheral portion that contains the outer tip surface holes is positioned farther toward the tip end of the sensor device than is the central portion, and an inclined surface connects the central portion to the outer tip surface holes; and
the side surface on a tip side of the inner cover is tapered, and on the outer periphery of the side surface on the tip side of the inner cover, a clearance between the inner cover and the outer cover becomes smaller from the tip side toward a base end of the inner cover.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
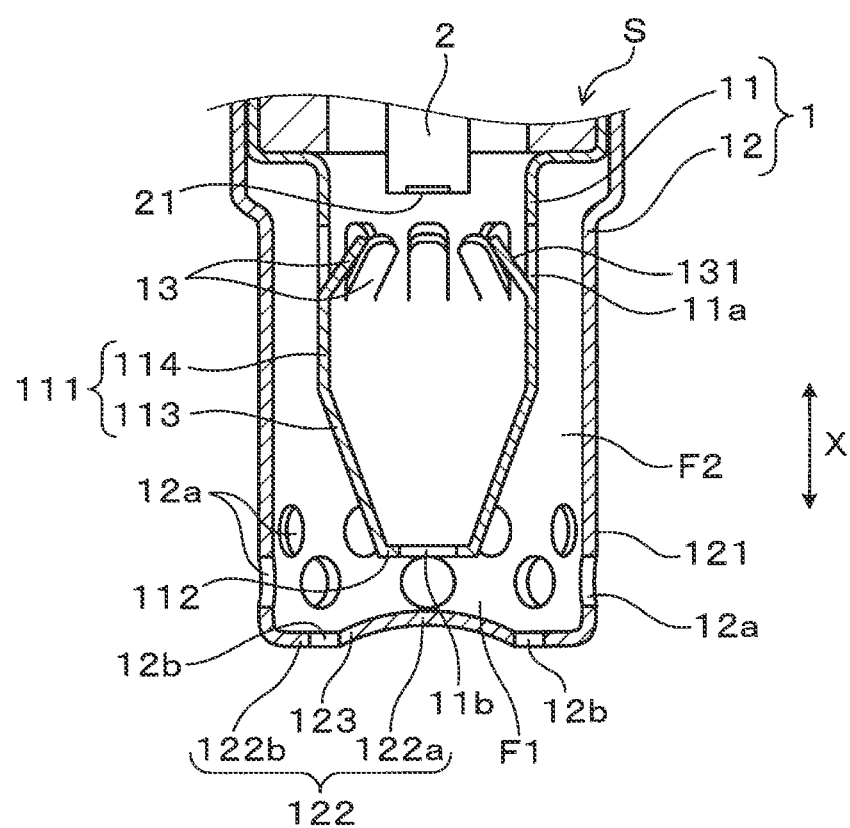
FIG. 1 is an enlarged cross-sectional view in an axial direction of the main parts of a PM sensor according to a first embodiment.

A conventional sensor device generally includes a sensor element that protrudes from a housing in which it is seated, and an element cover that surrounds the outer periphery of the sensor element. The sensor element includes a detection unit at the tip (the protruding end) which is protected by the element cover, and detects a specific component contained in an exhaust gas that is introduced into the element cover. The element cover is generally configured as a single or double container.

For example, in the gas sensor described in JP 2018-180002 A, the element cover has a double cover structure, with an inner cover and an outer cover arranged such as to provide a space outside the inner cover. The exhaust gas flows into the space between the two covers through gas flow holes that open on the side surface of the outer cover, and is introduced into the interior of the inner cover through gas flow holes that open on the side surface of the inner cover. The exhaust gas that comes into contact with the sensor element within the inner cover then travels toward a gas flow hole that opens at the tip surface of the inner cover, and flows out, joining gas that is passing outside the inner cover.

When the temperature inside the exhaust gas passage of an engine falls, after the engine has stopped, condensation of water contained in the exhaust gas is liable to occur. The gas sensor described in Patent Document 1 has an element cover configuration in which gas flow holes formed in the tip surfaces of the inner cover and the outer cover are positioned such as not to face one another, for suppressing the intrusion of water condensate from the exterior. In addition, the configuration is formed with a reduced-diameter step at the tip end of the inner cover, and the water condensate contained in the exhaust gas that travels toward an inner side flow hole in the inner cover collides with the reduced-diameter step, thereby separating the water condensate from the exhaust gas, and so suppressing the intrusion of water condensate into the interior of the inner cover.

On the other hand, in recent years the number of vehicles equipped with an idling stop mechanism has increased, and it has been found that when the exhaust gas temperature drops sharply due to the engine stopping during idling, condensation of moisture also occurs inside the element cover of the sensor. If the water condensate remains inside the element cover, then when the engine is restarted, the condensate is liable to then become drawn up by the exhaust gas that flows into the element cover, and so can readily reach the gas flow hole on the side surface of the inner cover. In that case, water condensate can enter the interior of the inner cover and adhere to the sensor element, which may cause element cracking due to water contact (referred to in the following as water adherence cracking, where appropriate).

If the exhaust gas flow velocity within the element cover becomes lower, the transporting of water condensate by the exhaust gas is suppressed, however it is desirable to increase the exhaust gas flow velocity so that the gas reaches the sensor element quickly, in order to improve the performance of the sensor element in detecting particulate matter etc., in the exhaust gas. Hence in general, many conventional element covers have a structure in which the tip surface of the inner cover is formed integrally with the tip surface of the outer cover, in order to promote gas exchange. In that case, the configuration has gas flow holes that open directly to the exterior, and almost no measures have been taken regarding water resistance.

It is an object of the present disclosure to provide a sensor device achieving superior performance, having a configuration in which a sensor element is housed in an element cover having a double structure, whereby water resistance can be improved and water cracking of the sensor element can be suppressed, enabling higher reliability and improved detection capability.

The present disclosure provides a sensor device including:
a sensor element having a detection unit for detecting a specific component in a gas under measurement,
a housing having a sensor element inserted into the interior thereof, retained with a detection unit positioned at the tip end of the sensor element with respect to the axial direction, and
an element cover disposed at the tip end of the housing coaxially,
with the element cover including an inner cover disposed such as to cover the tip end of the sensor element and an outer cover disposed with a space between the outer cover and the outer periphery of the inner cover; wherein
an inner side hole and an inner tip surface hole, through which the gas under measurement circulates, are provided in a side surface and a tip surface respectively of the inner cover;
a plurality of outer side holes, through which the gas under measurement circulates, are provided in a side surface of the outer cover, with the tip positions of the outer side holes being located farther toward the tip end of the sensor device than is the tip position of the inner cover;
a plurality of outer tip surface holes are provided in the tip surface of the outer cover, located farther outward than positions facing the outer periphery of the inner tip surface hole; and
in the tip surface of the outer cover, a central portion which faces the inner tip surface hole protrudes towards the inner tip surface hole, an outer peripheral portion that contains the outer tip surface holes is positioned farther toward the tip end of the sensor device than is the central portion, and an inclined surface connects the central portion to the outer tip surface holes.

According to the above configuration, when the sensor device is not operating and moisture is generated within the element cover due to water condensation, then even if the water condensate falls under its own weight from a surface of the inner cover onto the tip surface of the outer cover, the water condensate is prevented from remaining, due to the protruding shape of the central portion of the tip surface of the outer cover. The water condensate water quickly travels along the inclined surface, from the central portion of the tip surface of the outer cover to the outer peripheral portion of that tip surface, which is at the tip end of the sensor device, and is quickly discharged to the exterior from the plurality of outer tip surface holes provided in the outer peripheral portion.

Hence, even if the gas to be measured is introduced into the element cover when the sensor device is operated, accumulated water is can be prevented from being drawn up and penetrating the interior of the inner cover, so that the sensor element can be prevented from being exposed to water.

Furthermore, in the element cover, the tip positions of the outer side holes are closer to the tip end than is the tip position of the inner cover, and the flow of the gas to be measured is introduced from the outer side holes in a direction orthogonal to the axial direction of the inner tip surface hole, so that this flow of gas results in a negative pressure being generated in the vicinity of the inner tip surface hole. Due to the suction effect of this negative pressure, an outward flow out from the inner tip surface hole to the outer cover is formed, so that the flow of gas toward the sensor element is promoted and the detection performance is enhanced.

As described above, according to the above aspect, with a configuration in which a sensor element is contained within an element cover having a double-cover configuration, the flow velocity at which the gas to be measured travels toward the detection unit of the sensor element is increased, thereby enabling an improved performance by the detection unit in detecting a specific component, while also enabling water cracking to be prevented, and hence enabling a sensor device having improved performance and high reliability to be provided.

First Embodiment

Embodiments will be described in the following, referring to the drawings.

Figure 2:
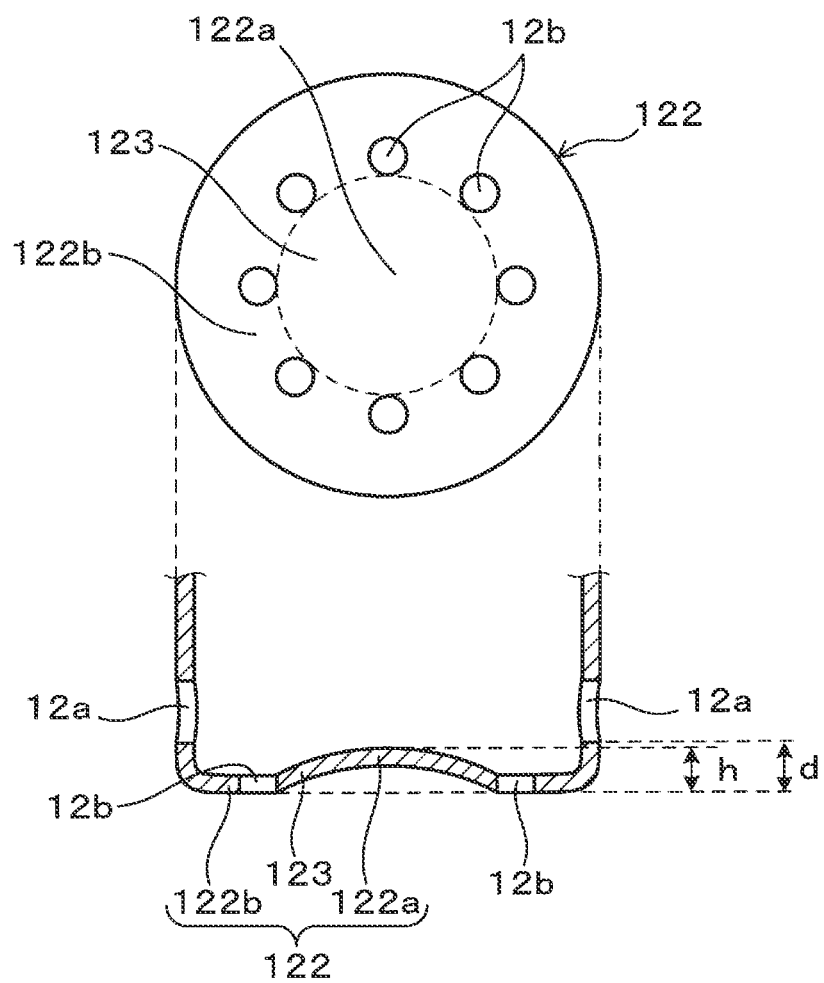
FIG. 2 is a plan view and a cross-sectional view in an axial direction of the element cover of the PM sensor according to the first embodiment.
Figure 3:
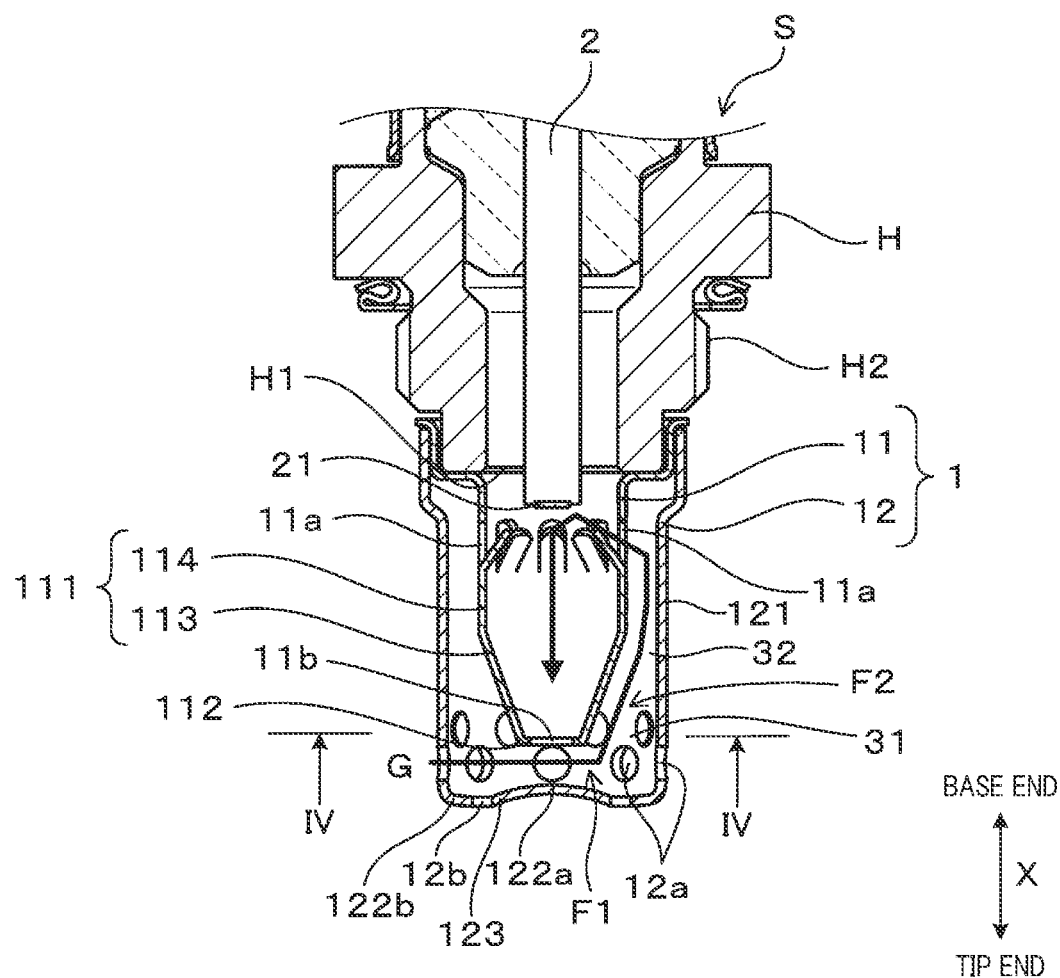
FIG. 3 is a cross-sectional view in an axial direction, schematically illustrating the configuration of the PM sensor according to the first embodiment.
Figure 5:
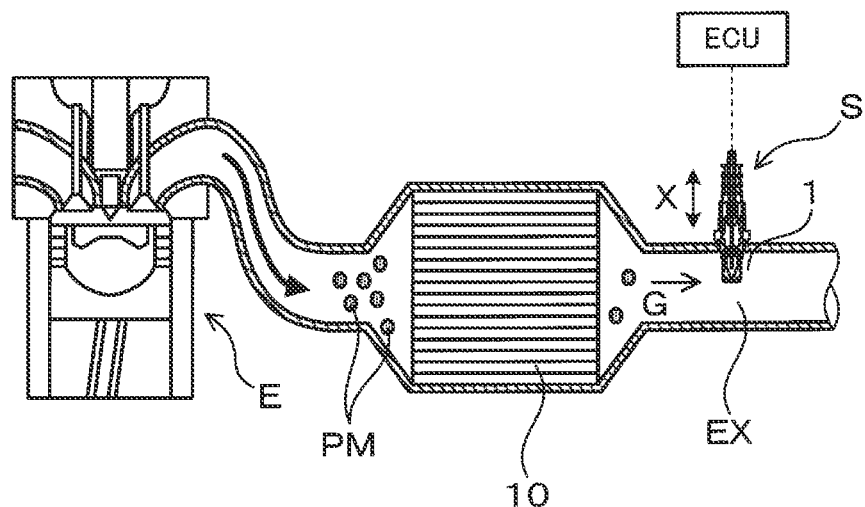
FIG. 5 is a diagram showing a schematic configuration example of an exhaust gas purification system including a PM sensor according to the first embodiment.

As shown in FIGS. 1 to 3, a sensor device according to the present embodiment is a PM sensor S for detecting particulate matter, and is applied, for example, in an exhaust gas purification device of an internal combustion engine E shown in FIG. 5. In FIG. 1, the PM sensor S includes a sensor element 2 having a detection unit 21, a housing H into which the sensor element 2 is inserted and is retained therein with the detection unit 21 positioned at the tip end of the sensor element 2 with respect to an axial direction X, and an element cover 1 disposed at the tip end of the housing H.

The internal combustion engine E is, for example, a diesel engine or gasoline engine of an automobile, and the detection unit 21 of the sensor element 2 detects particulate matter that is a specific component contained in the exhaust gas, which is the gas to be measured. In the PM sensor S, the vertical direction of FIGS. 1 and 3 is the axial direction X of the housing H and the element cover 1, with the tip end as the lower end and the base end as the upper end. The leftward side in FIG. 3 is the upstream side of the flow direction of the exhaust gas G as shown in the diagram, and the rightward side is the downstream side.

In FIG. 1, the element cover 1 has an inner cover 11 disposed coaxial with the PM sensor S such as to cover the tip end of the sensor element 2 with respect to the axial direction X of the housing H, and an outer cover 12 disposed outside the inner cover 11, with a space between the inner cover 11 and the outer cover 12. Inner side holes 11a and an inner tip surface hole 11b, through which the gas to be measured flows, are provided in the side 111 and in the tip surface 112 of the inner cover 11 respectively. Furthermore, the outer cover 12 is provided with a plurality of outer side holes 12a in the side surface 121, through which the gas to be measured flows, with the tip positions of the outer side holes 12a being closer to the tip end than is the tip position of the inner cover 11.

A plurality of outer tip surface holes 12b are provided on the tip surface 122 of the outer cover 12, outside positions that face the outer peripheral edge of the inner tip surface hole 11b. In the tip surface 122 of the outer cover 12, the central portion 122a facing the inner tip surface hole 11b projects toward the inner tip surface hole 11b, and the outer peripheral portion 122b, where the outer tip surface holes 12b are disposed, is positioned closer to the tip end than is the central portion 122a, while in addition the tip surface has an inclined surface 123 that connects the central portion 122a and the outer tip surface holes 12b.

As shown in FIG. 3, a first flow path F1, having a direction orthogonal to the axial direction X as the gas flow direction, is formed inside the tip surface 122 of the outer cover 12. The inner side holes 11a are open to a second flow path F2, provided between the outer surface of the inner cover 11 and the inner surface of the outer cover 12. Furthermore, the second flow path F2 has a large clearance portion 31, having the maximum clearance, at the outer peripheral side of the tip surface 112 of the inner cover 11, and has a small clearance portion 32, having the minimum clearance, positioned closer to the base end than is the large clearance portion 31 (see, for example, FIG. 3).

Preferably, the side surface 111 of the inner cover 11 is a tapered surface that successively decreases from the base end, corresponding to the small clearance portion 32, to the tip end, corresponding to the large clearance portion 31. The second flow path F2 has a shape in which the large clearance portion 31 and the small clearance portion 32 are connected without a step.

As shown in FIG. 2, in the outer cover 12, the central portion 122a of the tip surface 122 is preferably located at the position of the outer periphery of the outer side holes 12a, or farther toward the tip end than the outer side holes 12a. The height h of the base surface of the central portion 122a above the tip side of the tip surface 122 is made equal to or less than the distance d between the tip side of the tip surface 122 and the outer periphery of the outer side hole 12a. Furthermore, the plurality of outer tip surface holes 12b are preferably evenly arranged circumferentially in the tip surface 122, and function as drain holes.

The inner cover 11 is preferably provided with guide bodies 13 that slope and extend inward from the tip portions of the inner side holes 11a.

The configuration of the element cover 1 is described in detail hereinafter.

In the PM sensor S shown in FIG. 3, a detection unit 21 of the sensor element 2 is protected by the element cover 1, in which the sensor element 2 is coaxially housed in a tubular housing H, protruding from a tip opening H1 and attached such as to cover the tip opening H1 of the housing H. The PM sensor S is screw-attached to the wall of the exhaust pipe EX of an internal combustion engine E, as shown in FIG. 5, by a screw member H2 provided on the outer periphery of the housing H, with the axial direction X in the vertical direction, and with the tip end of the PM sensor S projecting into the exhaust pipe EX, as the lower end of the sensor with respect to the vertical direction.

In FIG. 5, a diesel particulate filter (hereinafter referred to as DPF) 10 is installed in the exhaust pipe EX, and the PM sensor S constitutes, for example, part of an abnormality diagnosis system for the DPF 10. The PM sensor S is arranged on the downstream side of the DPF 10, detects particulate matter (that is, PM shown in the figure) contained in the exhaust gas G after the gas has passed through the DPF 10, and outputs the results of detecting the particulate matter to a control device ECU of the internal combustion engine E. This makes it possible to detect particulate matter that slips through the DPF10 and to diagnose abnormality in the DPF10. At the downstream position of the DPF 10, the flow direction of the exhaust gas G is orthogonal to the axial direction X of the PM sensor S.

Figure 6:
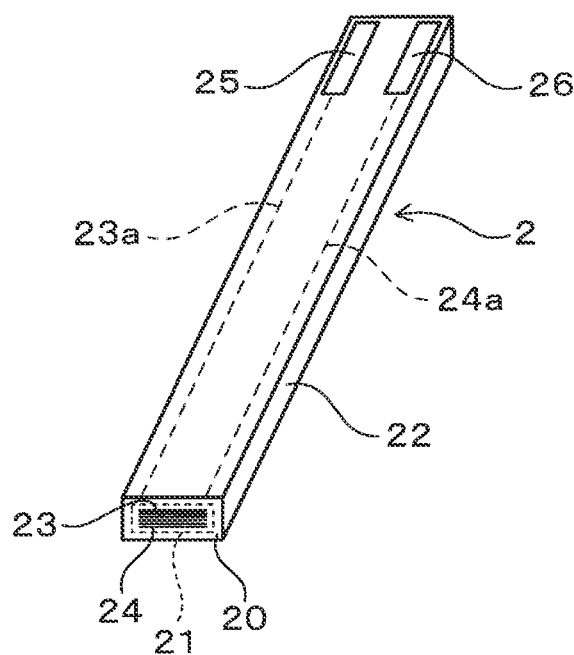
FIG. 6 is an overall perspective view of the sensor element of the PM sensor according to the first embodiment.

As shown in FIG. 6, the sensor element 2 is a laminated element with a laminated structure, having an insulating substrate 22 with the shape of a rectangular parallelepiped, and having the surface of the tip of the insulating substrate 22 as a detection surface 20, on which a detection unit 21 is arranged, with electrodes 23 and 24 exposed on the detection surface 20. The insulating substrate 22 is formed, for example, by firing a laminate in which electrode films that are to constitute the electrodes 23 and 24 are arranged in alternation between a plurality of insulating sheets, that will constitute the insulating substrate 22. The edges of the electrodes 23 and 24 are at least partially embedded in the insulating substrate 22 and are linearly exposed on the tip of the insulating substrate 22, constituting a plurality of electrode pairs that are composed of linear electrodes having alternately different polarities.

The linear electrodes forming the plurality of electrode pairs are arranged in parallel at intervals on the rectangular-shaped tip of the insulating substrate 22, excluding the outer peripheral edge, to form the detection unit 21. The detection unit 21 is, for example, the region surrounded by broken lines in the drawing, and includes a plurality of electrode pairs which face one another across an insulating layer that is sandwiched between them, and a part of the insulating sheets positioned at the outer periphery of the plurality of electrode pairs. Lead portions 23a and 24a are connected to the electrode films that become the electrodes 23 and 24, and are disposed inside the insulating substrate 22, connected to terminal electrodes 25 and 26 that are formed on a surface at the base end of the insulating substrate 22. When a predetermined detection voltage is applied to the electrodes 23 and 24, the detection unit 21 electrostatically collects particulate matter in the exhaust gas G that reaches the surface of the detection unit 21.

The detection surface 20 is a region that is slightly larger than the detection unit 21, with the entire tip surface of the insulating substrate 22, including the outer peripheral edge of the detection unit 21, constituting the detection surface 20. This is due to the fact that if the exhaust gas G reaches the outer peripheral edge of the detection surface 20, the exhaust gas G can readily reach the front of the detection unit 21, passing along the surface of the detection unit 21, and hence the area that is to constitute the detection surface 20 can be appropriately determined.

The shape of the sensor element 2 is not limited to that described, and the sensor element 2 may have a rectangular parallelepiped shape in which the tip surface of the insulating substrate 22 is substantially square. In that case too, the entire square-shaped tip surface becomes the detection surface 20, with the detection unit 21 occupying all of that surface other than the outer peripheral edge. Furthermore, it would be equally possible for more linear electrodes than those of the sensor element 2 shown in FIG. 6 to be arranged in parallel on the surface of the square detection unit 21 at intervals, to form a prescribed number of electrode pairs.

The insulating substrate 22 can be constructed by using an insulating ceramic material such as alumina. Furthermore, the electrodes 23 and 24, the lead portions 23a and 24a, and the terminal electrodes 25 and 26 can be formed using a conductive material such as a noble metal. The element cover 1 of this embodiment will next be described in detail.

The element cover 1 shown in FIGS. 1 and 3 has the form of a double container that is open at the housing end H, and includes an inner cover 11 and an outer cover 12 which are disposed coaxially. The outer cover 12 has a side surface 121 forming a tubular body having a substantially constant diameter, and a tip surface 122 which closes the tubular body, while the inner cover 11 has a side surface 111 forming a tubular body and a tip surface 112 that closes the tubular body, disposed with a space between the side surface 111 of the inner cover 11 and the outer cover 12. The base end portion of the inner cover 11 is expanded in diameter, into close contact with the base end portion of the outer cover 12, and is integrally attached to the tip end portion of the housing H.

The outer cover 12 is provided with a plurality of outer side holes 12a on the side surface 121 in the vicinity of the tip surface 122. A first flow path F1 is formed between the tip surface 122 inside the outer cover 12 and the tip surface 112 of the inner cover 11, through which the exhaust gas G flows in a direction orthogonal to the axial direction X. It is only necessary for the configuration to be such that at least the tip position of the outer side holes 12a is farther toward the tip end than is the inner tip surface hole 11b, which is the tip position of the inner cover 11, and such that the exhaust gas G can flow through the first flow path F1.

Preferably, the centers of the outer side holes 12a are disposed closer to the tip end than the inner tip surface hole 11b, in which case the gas flow can be readily formed such that there is a high flow rate of exhaust gas G that flows in the first flow path F1 and passes to the second flow path F2.

In this embodiment, the outer side holes 12a are arranged in two rows on the side surface 121 of the outer cover 12, with respect to the axial direction X. In each row, the outer side holes 12a are arranged at a plurality of locations (for example, four or more locations) in the circumferential direction, and in this case, they are evenly arranged at eight locations at equal spacings, with the positions of the first and second rows of the tip end outer side holes 12a from the tip end being staggered such as not to overlap in the axial direction X. Here, the outer side holes 12a in the first row are located between the inner tip surface hole 11a and the outer cover 12, and the outer side holes 12a in the second row are arranged so as to surround the tip part of the inner cover 11, disposed at substantially the same tip position as the inner tip surface hole 11b.

The outer side holes 12a are, for example, circular through holes, through which the exhaust gas G is introduced into the first flow path F1. The number and arrangement of the outer side holes 12a are not necessarily limited, but by arranging them evenly around the circumference of the side surface 121, a configuration can be obtained which does not have directivity with respect to the gas flow, and not only is ease of assembly improved, but also the flow rate of gas flow in the second flow path F2 is stable. In particular, by arranging the outer side holes 12a in two rows in a staggered manner as shown in the drawing, the outer side holes 12a at 16 locations are configured to be evenly opened all around, and the flow is less affected by the mounting angle.

The number of rows of outer side holes 12a, the number of outer side holes 12a in each row, the positional relationship with the inner tip surface hole 11a, and the like may be changed as appropriate. For example, the tip position of the outer side holes 12a in the second row may be closer to the tip end than the inner tip surface hole 11a.

Figure 4:
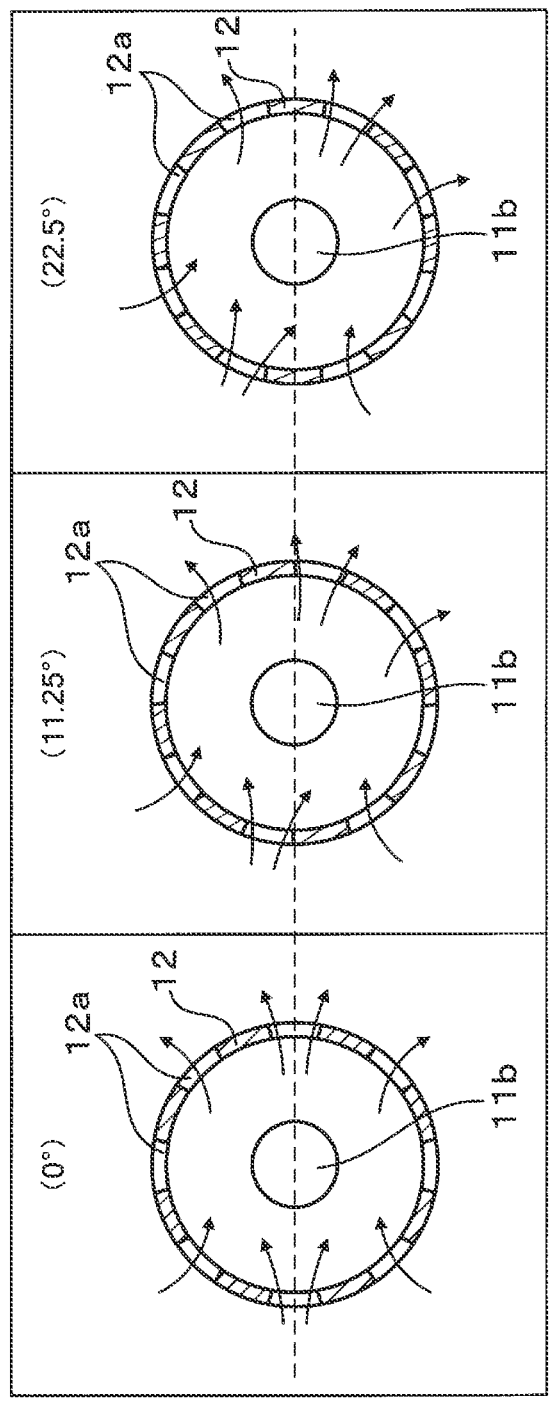
FIG. 4 shows radial cross-sectional views for describing the gas flow within the element cover of the PM sensor according to the first embodiment, and are sectional views taken along line IV-IV in FIG. 3.

As shown in FIG. 4 which schematically shows gas flows based on CAE analysis results, a good gas flow is formed irrespective of the mounting angle of the element cover 1, by arranging the gas flows in two rows in a staggered manner. The diagrams show a cross-section (that is, a IV-IV cross section) taken at the position of the second row of outer side holes 12a, with the left-side diagram in FIG. 4 showing the case in which the mounting angle is 0°, with outer side holes 12a being positioned along the axis. The central and right-side diagrams in FIG. 4 show the cases in which the mounting angle is 11.25° and 22.5°, respectively, and the outer side holes 12a are located slightly offset from the axis, but in which exhaust gas G can also be taken in through the outer side holes 12a in the first row (not shown), so that the gas flow rate does not decrease significantly.

The tip surface 122 of the outer cover 12 is formed in with a curved shape in which the central portion 122a, facing the inner tip surface hole 11b, is protruding, protruding toward the inner tip surface hole 11b. The tip surface 122 has the central portion 122a facing the inner tip surface hole 11b, an outer peripheral portion 122b that is located outside the central portion 122a and is provided with a plurality of outer tip surface holes 12b, and an inclined surface 123 that connects the central portion 122a to the outer tip surface holes 12b in the outer peripheral portion 122b. The outer peripheral portion 122b is located at the base end of the central portion 122a and the inclined surface 123, and is located at the lowermost end, with respect to the vertical direction, when attached to the exhaust pipe. The outer tip surface holes 12b are located at the lowermost end of the outer peripheral portion 122b, outside positions that face the outer periphery of the inner tip surface hole 11b, and close to the boundary with the inclined surface 123.

As shown in FIG. 2, the inclined surface 123 forms a part of a curved surface portion having a protruding cross-section that extends continuously from the central portion 122a, and has the outer peripheral portion 122b around its periphery, formed as an annular flat portion.

The outer tip surface holes 12b are, for example, circular through holes, which serve as drainage holes for discharging to the exterior any water condensate that is produced by condensation of moisture within the element cover 1, and water condensate contained in the exhaust gas G that is introduced into the interior of the element cover 1. The central portion 122a and the inclined surface 123 are formed in a curved surface shape in order to prevent retention of the water condensate, by promoting discharge of the condensate through the outer tip surface holes 12b, since water condensate that drops on the tip surface 122 under its own weight is collected on the outer peripheral portion 122b.

Hence, even when the exhaust gas G contains water condensate or when water condensate adheres to the interior of the outer cover 12, there is little possibility that the water condensate will penetrate to the interior of the inner cover 11 together with the exhaust gas G and reach the sensor element 2. Hence, the problem of cracking of the sensor element 2 due to water exposure can be suppressed.

The outer tip surface holes 12b are preferably arranged evenly at a plurality of locations (for example, four or more locations) on the outer peripheral portion 122b, being arranged here at eight locations at equal intervals. The discharge of water condensate is thereby promoted, the configuration is not directional with respect to the gas flow, and ease of assembly is improved.

As shown in FIG. 3, a second flow path F2 is provided between the outer surface of the inner cover 11 and the inner surface of the outer cover 12. The second flow path F2 has a large clearance portion 31 that provides a maximum clearance at the outer periphery of the tip surface 112 of the inner cover 11. In addition, the second flow path F2 has a small clearance portion 32, providing the minimum clearance, at the base end of the large clearance portion 31, and has a flow path shape in which the large clearance portion 31 and the small clearance portion 32 are connected without a step.

The tubular body constituting the side surface 111 of the inner cover 11 is continuous with the tip surface 112, and has a tapered first tubular portion 113 whose diameter expands toward the base end, and a second tubular portion 114 having a substantially constant diameter, which extends from the first tubular portion 113 toward the base end. The first tubular portion 113 is a tapered surface with a constant taper angle, and the large clearance portion 31 is formed between the first tubular portion 113 and the outer cover 12 at the tip end. The small clearance portion 32 is formed between the second tubular portion 114 and the outer cover 12.

The inner cover 11 has a tapered side surface shape that becomes reduced in size toward the tip end, from a position corresponding to the small clearance portion 32 to a position corresponding to the large clearance portion 31. As a result, water condensate that is generated on the outer surface of the inner cover 11 accumulates while moving toward the tip end under its own weight, and readily drops toward the tip surface 122 of the outer cover 12, which is the lowermost surface of the element cover 1. Hence, water condensate is prevented from being carried to the base end of the inner cover 11 by the exhaust gas flow, so that moisture is more effectively excluded.

The large clearance portion 31 is a portion where there is a maximum clearance in a direction orthogonal to the axial direction X, that is, where there is a maximum distance between the outer surface of the inner cover 11 and the inner surface of the outer cover 12. In the second flow path F2, facing the first tubular portion 113, the clearance successively decreases from the large clearance portion 31 at the tip end toward the base end.

The small clearance portion 32 is a portion where there is minimum clearance in a direction orthogonal to the axial direction X, that is, where there is a minimum distance between the outer surface of the inner cover 11 and the inner surface of the outer cover 12. In the second flow path F2, facing the second tubular portion 114, the clearance is constant from the tip end to the base end, and the small clearance portion 32 has the minimum clearance.

Designating the clearance (that is, the maximum clearance) in the large clearance portion 31 as d1 and the clearance (that is, the minimum clearance) in the small clearance portion 32 as d2, the detection sensitivity can be adjusted by adjusting the clearance ratio d1/d2. Preferably the clearance ratio d1/d2 is made 2.45 or more, enabling the output rise time to be reduced and the detection sensitivity to be improved.

The inner cover 11 has a plurality of inner side holes 11a provided in the middle, with respect to the axial direction X, of the second tubular portion 114, which is at the base end of the side surface 111. The inner side holes 11a are, for example, elongated through holes that are elongated in the axial direction X, are arranged circumferentially at a plurality of locations (for example, four or more locations), and are open to the second flow path F2. Each of the plurality of inner side holes 11a is provided with an elongated plate-shaped guide body 13, which is formed integrally with a tip edge portion of the hole. The base end edge of each inner side hole 11a and the extended end of the guide body 13 both have a rounded shape, with chamfered corners at both ends with respect to the width direction.

A single inner tip surface hole 11b is provided in the central portion of the tip surface 112 of the inner cover 11. The inner tip surface hole 11b is, for example, a circular through hole and opens into the first flow path F1.

The number and arrangement of the inner side holes 11a are not necessarily limited to those shown, but it is desirable that the inner side holes 11a are evenly arranged around the entire circumference of the side surface 111. With this example, the inner side holes 11a are arranged at eight locations at equal intervals in the circumferential direction of the side surface 111, and the guide bodies 13 that are integrated with these holes are arranged such as to radially surround the detection surface 20 of the sensor element 2. As a result, the configuration does not have directivity with respect to the gas flow, and not only is ease of assembly improved, but also the exhaust gas G that flows in from the second flow path F2 and along the guide bodies 13 can be guided to the detection surface 20 without reduction in the speed of the gas flow, so that the detection accuracy is improved.

Each guide body 13 shown in FIG. 1, is formed for example by cutting out a notched portion of the second tubular portion 114, such that the notched portion is integrated with the tip edge portion of an inner side hole 11a, and bending the notched portion at the tip edge portion of the inner side hole 1 la such as to slope inward to the interior of the inner cover 11. The detection surface 20 of the sensor element 2 is positioned closer to the base end, with respect to the axial direction X, than are the inner side holes 11a, and the guide bodies 13 are configured such that the detection surface 20 is positioned in the extension directions of the guide bodies.

As a result, the exhaust gas G is introduced directly toward the detection unit 21 that is located inside the outer peripheral edge of the detection surface 20, enabling more effective guidance of the gas and improved detection sensitivity.

The effect of the element cover 1 in improving detection accuracy and the water resistance of the sensor element 2 of the PM sensor S, when the element cover 1 has the above configuration, will next be described.

As shown by an arrow in FIG. 3, the exhaust gas G flows from one side of the PM sensor S toward the element cover 1 and is introduced into the element cover 1 through the outer side holes 12a which open in the side surface 121 of the outer cover 12. Since the outer side holes 12a are arranged in two rows, with one of the rows being located farther toward the tip end than is the tip position of the inner cover 11, the exhaust gas G flows directly through outer side holes 12a of one of the rows into the first flow path F1 between the tip surface 112 of the inner cover 11 and the tip surface 122 of the outer cover 12 in the element cover 1, at a sufficient flow velocity, toward opposing ones of the outer side holes 12a.

At that time, as described above, that flow of exhaust gas G becomes combined with a flow of exhaust gas G that is introduced through the other one of the two rows of outer side holes 12a, such that a good gas flow is formed irrespective of the mounting angle of the element cover 1. Furthermore, at the large clearance portion 31 located downstream with respect to the flow direction, the flow of a part of the exhaust gas G is changed in direction, and that part of the exhaust gas flows into the second flow path F2, between the side surface 111 of the inner cover 11 and the side surface 121 of the outer cover 12.

Since the flow area of the second flow passage F2 in the small clearance portion 32 is smaller than that in the large clearance portion 31 at the downstream side, the flow velocity of the exhaust gas G becomes increased by the Venturi effect as it approaches the inner side holes 11a, which open to the small clearance portion 32. Furthermore since the first tubular portion 113 of the inner cover 11 is farther toward the tip end than is the second tubular portion 114 which forms the small clearance portion 32, and the first tubular portion 113 is formed with a tapered shape, becoming smaller in diameter toward the tip end, so that the flow path area gradually becomes smaller from the large clearance portion 31 to the small clearance portion 32, eddy currents are not readily produced as the exhaust gas G flows along the side 111 of the inner cover 11.

Hence the flow velocity of the exhaust gas G is further increased by the effect of suppressing eddy currents, and the gas reaches the inner side holes 11a at a sufficiently high flow velocity. Furthermore, the gas flows into the interior of the inner cover 11 along the inclined surfaces 131 of the guide members 13 that are formed integrally with an inner side holes 11 a. Each guide member 13 is disposed such that the detection surface 20 of the sensor element 2 is located in the extension direction of the inclined surface 131, and due to the guidance effect of this, the exhaust gas G reaches the detection unit 21 at the tip surface of the sensor element 2 while maintaining a sufficiently high flow velocity. Such a flow of the exhaust gas G increases the supply flow rate to the detection unit 21, so that the time required for detecting particulate matter PM when the DPF 10 fails, etc., can be shortened, and the detection sensitivity of the sensor element 2 can be enhanced.

The exhaust gas G then passes toward the inner tip surface hole 11b opened in the tip surface 112 of the inner cover 11 (for example, see the thick arrow in FIG. 3). At this time, as described above, the exhaust gas G flowing in the first flow path F1, between the tip surface 112 of the inner cover 11 and the tip surface 122 of the outer cover 12, has a sufficiently high flow velocity to produce a negative pressure in the vicinity of the inner tip surface hole 11b.

Since no hole serving as a gas flow hole is formed in the tip surface 122 of the outer cover 12, in particular, at the central portion 122a facing the inner tip surface hole 11b, the flow direction of the exhaust gas G is orthogonal to the axial direction X. Since the inner tip surface hole 11b is not open in the flow direction of the exhaust gas G, and since due to the suction effect described above, a flow is formed through the inner tip surface hole 11b in a direction for merging with the flow of exhaust gas G in the outer cover 12, the exhaust gas G is prevented from flowing directly from the outer cover 12 through the inner tip surface hole 11b into the interior of the inner cover 11.

Hence, even if the exhaust gas G contains water condensate, or if moisture has condensed and caused water condensate to adhere to the inner surface of the outer cover 12 or to the outer surface of the inner cover 11, there is little possibility that such water condensate will penetrate together with the exhaust gas G through the inner tip surface hole 11b into the interior of the inner cover 11, and reach the sensor element 2. Furthermore, by suitably designing the shapes of the outer surface of the inner cover 11 and of the tip surface 122, which is the lowermost surface when the sensor is attached to the outer cover 12, the retention of water condensate is suppressed and discharge of the water is promoted.

This effect will be described in the following referring to FIG. 7, using a comparison with a first comparative example, in which the entire tip surface 122 of the outer cover 12 is made flat.

Figure 7:
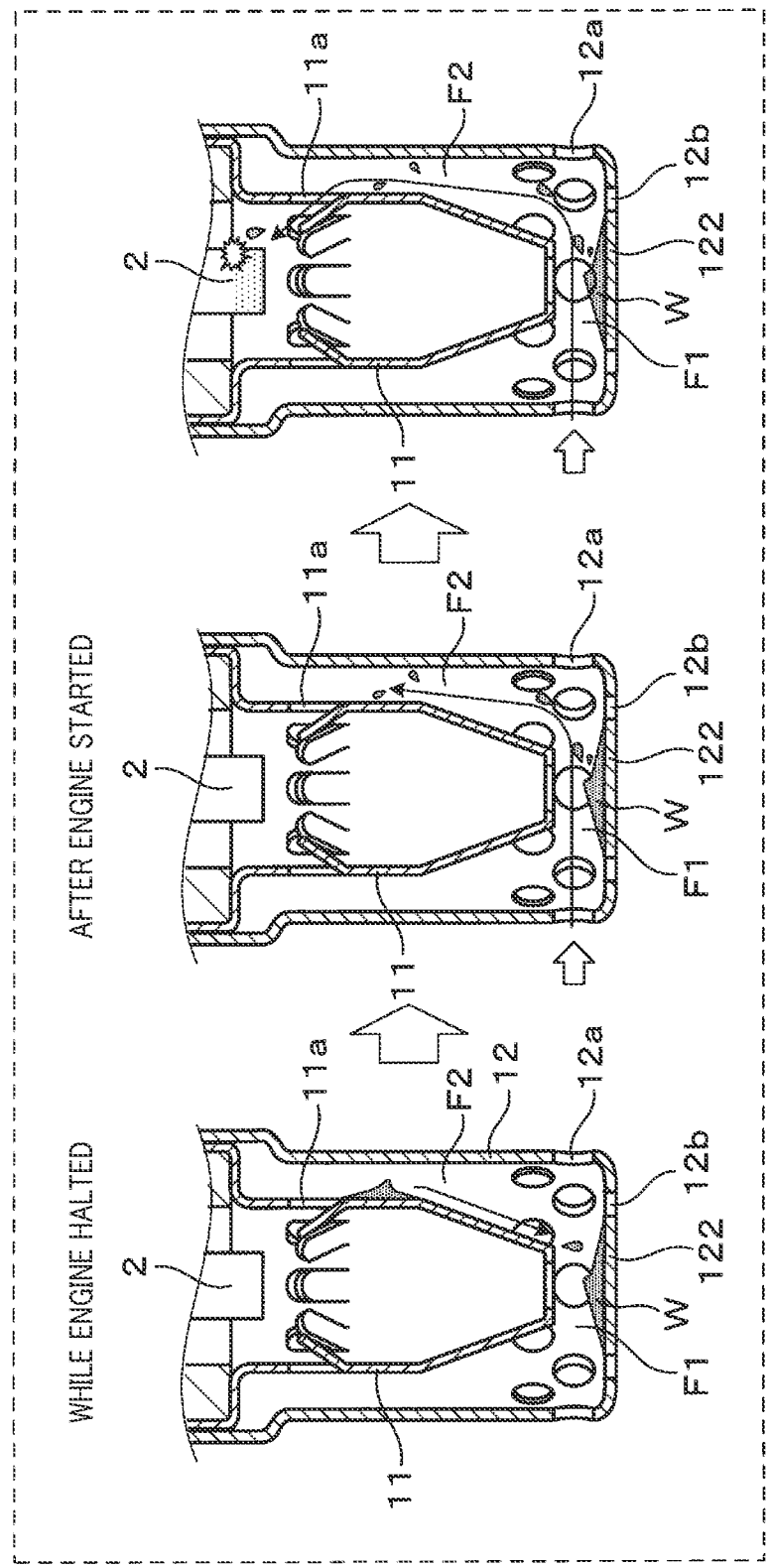
FIG. 7 shows axial cross-sectional views which illustrate a state of retention of water condensate within the element cover of the PM sensor according to the first embodiment, and illustrate how the accumulated water condensate is drawn up in the gas flow.

As shown in the left-side diagram of FIG. 7, when water condensate is produced within the element cover 1 while the engine is stopped, the water condensate travels along the inner surface of the outer cover 12 or the outer surface of the inner cover 11, falling under its own weight, then drops onto the tip surface 122 of the outer cover 12, and remains there. At this time, the oil content in the exhaust gas G forms an oil film on the wall surfaces in the element cover 1, making the water condensate that is produced more likely to fall.

As shown in the center diagram of FIG. 7, when the engine is started in this state, the accumulated water W on the tip surface 122 is scattered by the exhaust gas G that is introduced from the outer side hole 12a into the first flow path F1, and water droplets are then drawn along by the exhaust gas as it flows along the first flow path F1 toward the second flow path F2. As shown in the right-side diagram of FIG. 7, these water droplets then penetrate from the second flow path F2 through the inner side holes 11a into the interior of the inner cover 11, and when the sensor element 2 thereby becomes exposed to water, then since the element has become hot due to heating by the heater, cold-heat cracking may occur.

Figure 8:
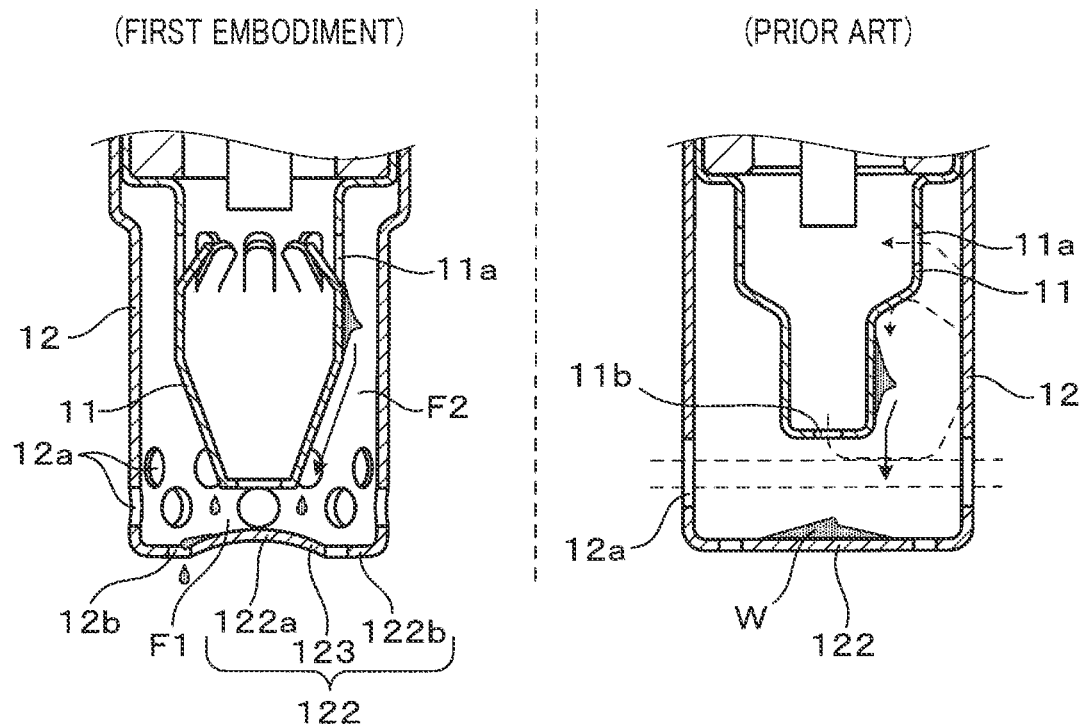
FIG. 8 shows axial cross-sectional views for comparing the effect of the element cover shape of the PM sensor according to the first embodiment with those of a conventional element cover shape.

On the other hand, with the configuration of the present embodiment shown in the left-side diagram of FIG. 8, the water condensate that has dropped onto the tip surface 122 under its own weight does not remain in the central portion 122a, but flows down from the curved central portion 122a along the inclined surface 123, traveling to the outer peripheral portion 122b. Due to the outer tip surface holes 12b provided around the entire circumference of the outer peripheral portion 122b, the water condensate is quickly discharged, thereby preventing wetting of the sensor element by accumulated water W that has been drawn up in the exhaust gas.

Even if the inner cover 11 is formed with a step, whereby its diameter becomes reduced at the tip end, as in the prior art configuration shown in the right-side diagram of FIG. 8, travel of water condensate from the step portion to the base end is suppressed.

When the exhaust gas G collides with the stepped portion, a vortex is generated, which tends to decrease the velocity of the gas flow toward the interior of the inner cover 11.

In that case also, with the configuration of this embodiment, since the first cylinder portion 113 at the tip end of the inner cover 11 is a tapered surface, water condensate that becomes separated from the exhaust gas G by colliding with the first cylinder portion 113, or water condensate that adheres to the first cylinder portion 113, tends to collect along the tapered surface. Hence, dropping of the water condensate from the tip surface 112 of the inner cover 11 is promoted, and the effect of suppressing contact of water with the sensor element can be enhanced.

It should be noted that it is not necessary for the tapered surfaces forming the first tubular portion 113 of the inner cover 11 to have a constant taper angle.

For example, it would be equally possible to use a plurality of tapered surfaces having different taper angles, connected in the axial direction X. In that case also the same effects can be obtained, by smoothly connecting all of the parts of the first tubular portion 113, forming a substantially tapered shape whose diameter successively becomes reduced from the base end to the tip end.

Figure 9:
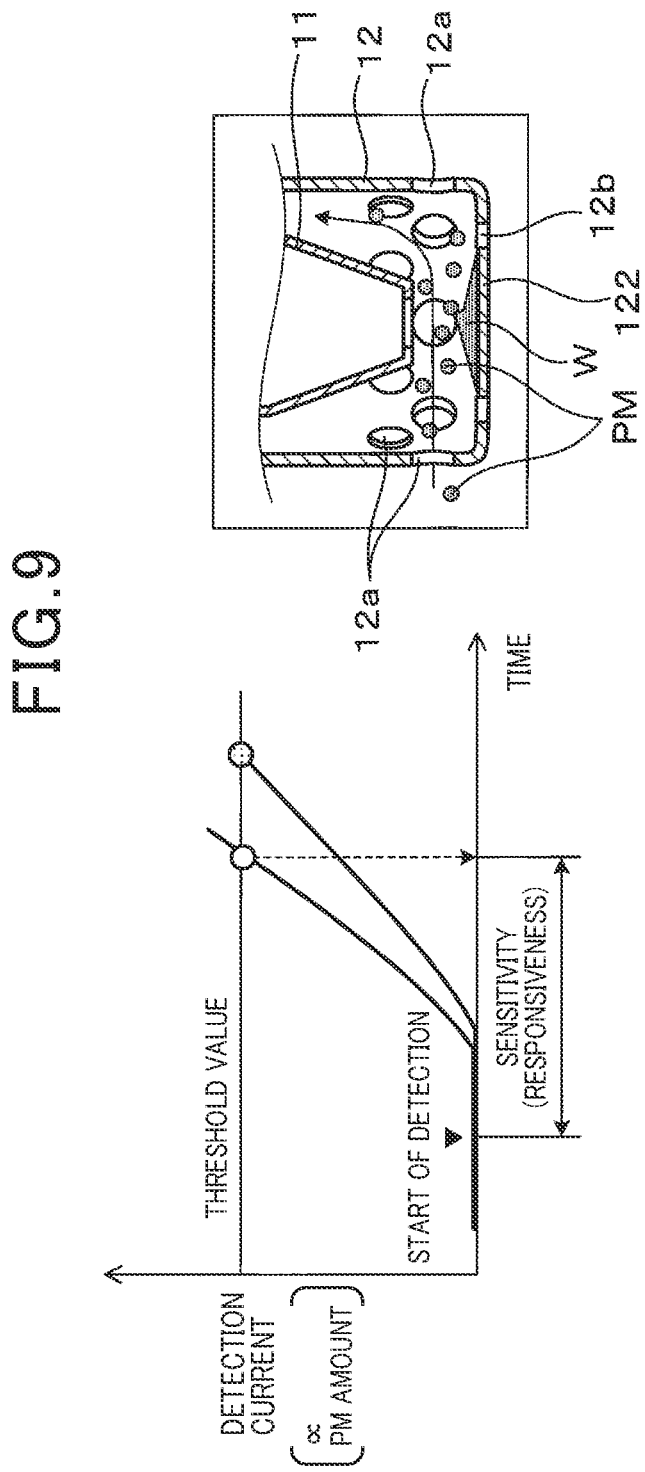
FIG. 9 shows a diagram of the PM detection characteristics of the PM sensor according to the first embodiment, and a cross-sectional view of a main part of the PM sensor in the axial direction, illustrating the influence of accumulated water on PM detection.

Furthermore, if the tip surface 122 of the outer cover 12 of the PM sensor S is configured as a flat surface, as in the first comparative example shown in the right-side diagram of FIG. 9, particulate matter contained in the exhaust gas G readily becomes adsorbed on the accumulated water W. As a result, as shown in the left-side diagram of FIG. 9, the detection current of the sensor element 2, which is proportional to the PM amount, does not increase promptly after the start of detection, so that the detection sensitivity (that is, responsiveness) may decrease.

However, in that case too, with the configuration of this embodiment, accumulated water W is unlikely to be produced on the tip surface 122, so that the adsorption of particulate matter is suppressed, and hence the particulate matter is not hindered in reaching the sensor element 2.

Figure 10:
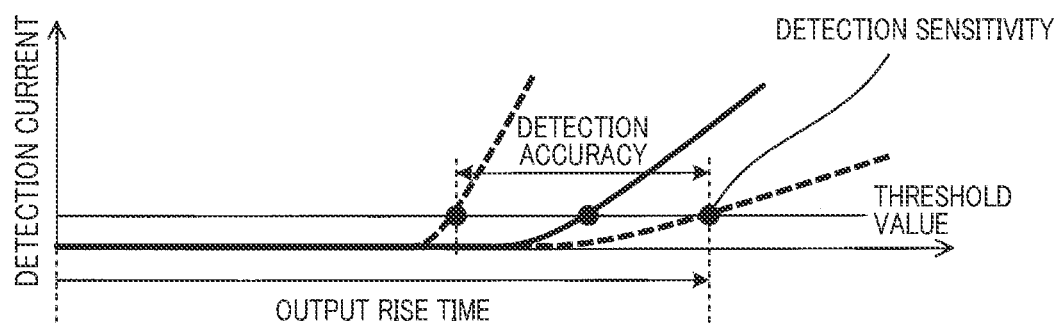
FIG. 10 illustrates the relationship between the output rise time and the detection current, in PM detection by the PM sensor according to the first embodiment.

Thus, as shown in FIG. 10, the output rise time, which is the time until the detection current exceeds the threshold value, is shortened, the detection sensitivity is improved, and variation in the output rise time is suppressed, so that the detection accuracy is improved.

(Test Specimen 1)

Figure 11:
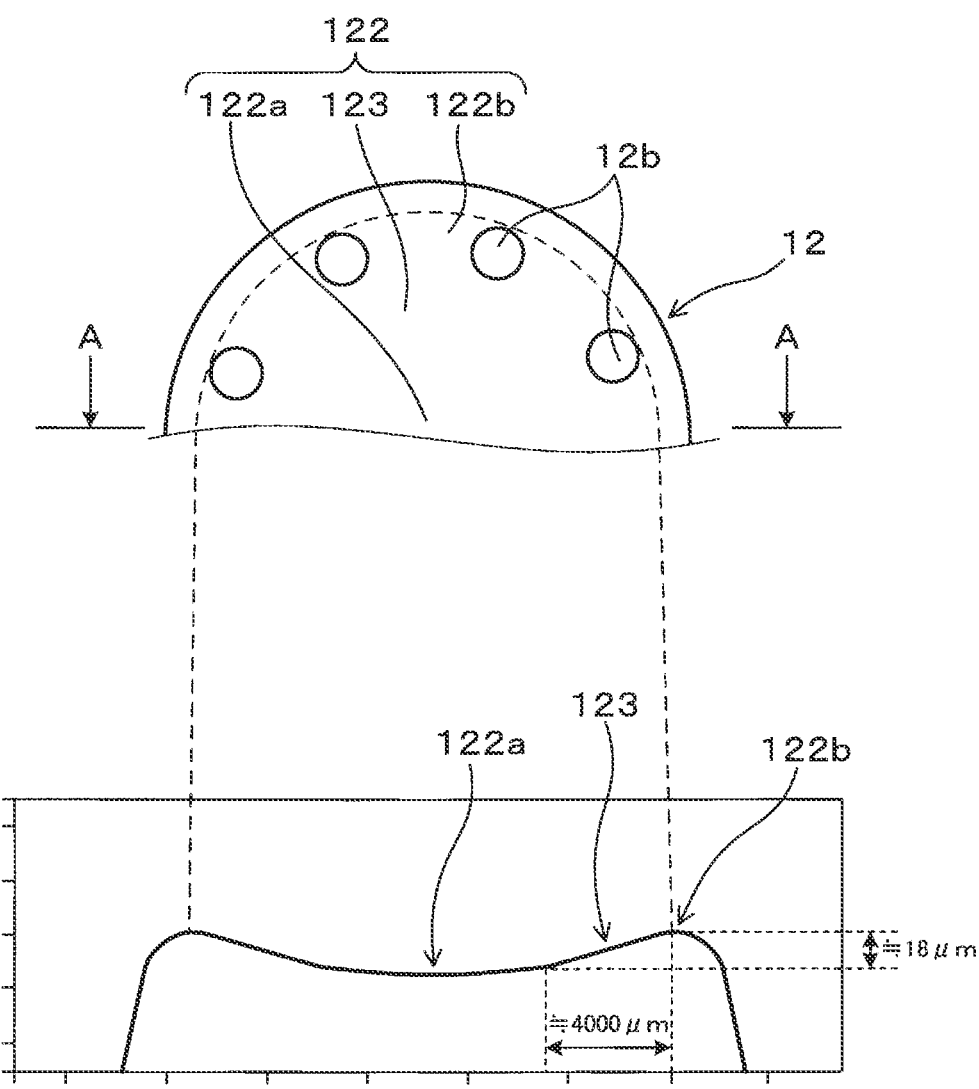
FIG. 11 shows the tip surface shape of the element cover of a first test specimen of a PM sensor, and a cross-sectional view of the tip surface taken along line A-A.

A prototype outer cover 12, as shown in FIG. 11, was made by drawing metal plate, and the effect of the shape of the tip surface 122 was confirmed. In this example, in cross-section, almost the entire surface from the central portion 122a to the outer peripheral portion 122b of the tip surface 122 is a protruding curved surface portion, and the outer peripheral portion 122b is formed in a shape that slopes to become continuous with the inclined surface 123.

When a gas containing water was repeatedly introduced and halted into a model of the PM sensor S having the outer cover 12, and the state of generation and retention of water condensate was observed, it was found that water condensate which was produced became discharged through the outer tip surface holes 12b, and did not remain in the central portion 122a of the tip surface 122.

A part of the tip surface 122 of the outer cover 12 that is close to the central portion 122a has a relatively gentle inclination angle, while there is a large inclination angle close to the outer peripheral portion 122b. As an example, as shown in the figure, the inclination angle θ on the inclined surface 123 near the outer peripheral portion 122b was θ≈0.26 degrees, with tan θ≈18 μm/4000 μm. Hence, the water condensate is effectively discharged if the inclined surface 123 of the tip surface 122 of the outer cover 12 is shaped suitably, for example is formed such as to have an inclination angle θ of at least 0.2 degrees, and if the central portion 122a and the outer peripheral portion 122b are shaped with inclinations such that the positional relationships in the outer side holes 12a are appropriate.

Second Embodiment

A second embodiment of the PM sensor S as a sensor device will be described referring to FIGS. 12 and 13. In the outer cover 12 of the element cover 1 of the present embodiment, the shape of the tip surface 122 and the arrangement of the outer side holes 12a are changed. Furthermore, the detection unit 21 is provided on a side surface of the sensor element 2. Since the other basic configuration of the PM sensor S is the same as in the first embodiment, detailed description will be omitted, and mainly the points of difference will be described.

It should be noted that in the descriptions of the second and subsequent embodiments, designations that are identical to those used in the preceding embodiments represent the same components, etc., as in the preceding embodiments, unless otherwise specified.

Figure 12:
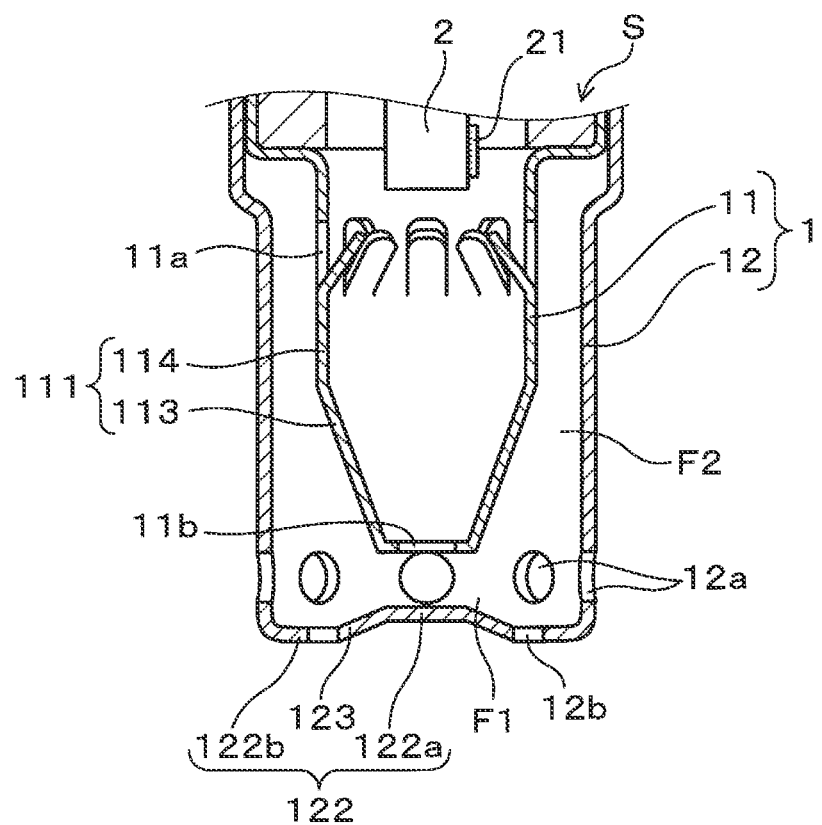
FIG. 12 is an enlarged cross-sectional view taken in the axial direction of the main parts of a second embodiment of a PM sensor.

With the first embodiment, in the tip surface 122 of the outer cover 12, the central portion 122a and the inclined surface 123 are formed as a continuous curved surface, protruding in cross section, however as shown in FIG. 12, it would be equally possible for the central portion 122a facing the inner tip surface hole 11b to be a flat surface.

In this case too, the outer peripheral portion 122b can be located farther toward the tip end of the sensor device than the central portion 122a, that is, lower than the central portion 122a with respect to in the vertical direction, and the inclined surface 123 that follows the central portion 122a is, for example, shaped as a tapered surface that slopes downward toward the outer peripheral portion 122b.

Hence, water condensate that collects at the tip end of the side surface 111 of the inner cover 11 falls under its own weight and travels along the inclined surface 123, and is discharged from the outer tip surface holes 11b.

Figure 13:
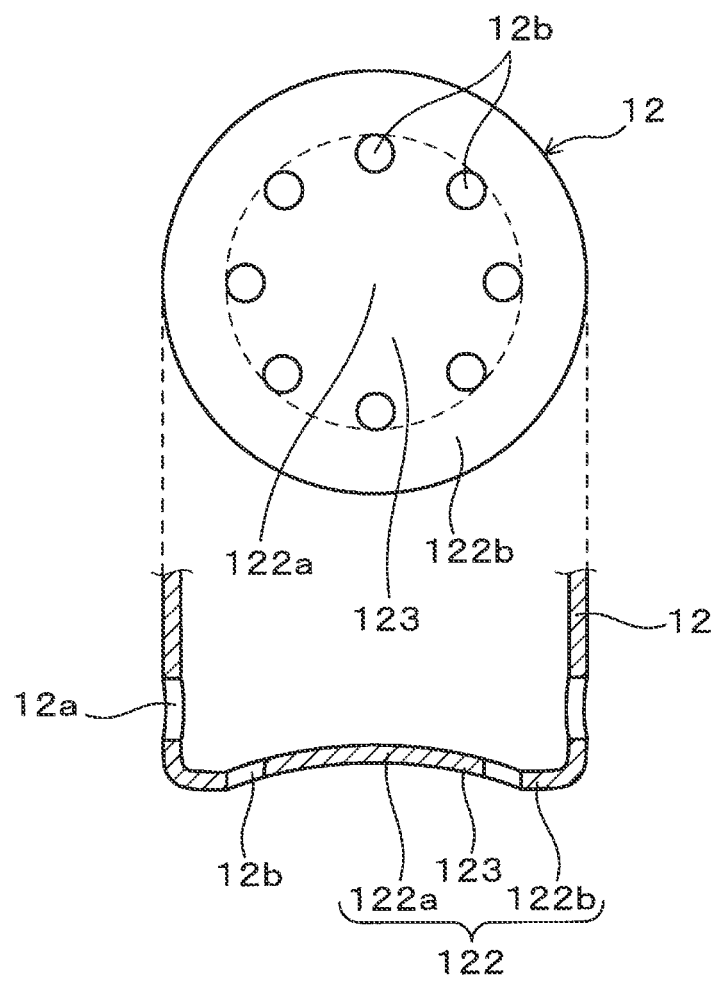
FIG. 13 is a plan view and an axial cross-sectional view showing another example of the tip surface shape of the element cover of the PM sensor according to the second embodiment.

Alternatively, as shown in FIG. 13, in the tip surface 122 of the outer cover 12, the outer peripheral portion 122b having the outer tip surface holes 11b may be formed as a curved surface shape which is continuous with the central portion 122a and the inclined surface 123.

In that case, the outer tip surface holes 11b may be arranged on the curved surface portion such as to follow the inclined surface 123, as shown in the drawing, however it is preferable for the outer tip surface holes 11b to be positioned at the lowest end of the tip surface 122 with respect to the vertical direction.

Furthermore, in the first embodiment, the outer side holes 12a are provided in two rows with respect to the axial direction X, however it would be equally possible for there to be only a single row. In that case, it is desirable for at least the tip position of the outer side holes 12a to be farther toward the tip end than is the inner tip surface hole 11b, which is the tip position of the inner cover 11, and for the outer side holes 12a to be formed such as to enable the exhaust gas G to flow through the first flow path F1.

In the present embodiment, the outer side holes 12a are located at positions that do not overlap with the inner tip surface hole 11b, in the axial direction X, and for example the tip end position of the inner tip surface hole 11b and the base end position of the outer side holes 12a may be made the same. In that configuration, since the exhaust gas that is introduced from the outer side holes 12a flows into the first flow path F1 without colliding with the inner cover 11, the flow rate of the exhaust gas G through the first flow path F1 is increased, and a gas flow to the second flow path F2 is readily formed.

The sensor element 2 is a laminated element similar to that of the first embodiment, and has a detection unit 21 on one side surface, at the tip end of a rectangular parallelepiped insulating substrate 22. Also in this embodiment, the detection unit 21 is provided with a pair of electrodes 23 and 24, and has a configuration in which the detection unit 21 is connected to the terminal electrodes 25 and 26 via lead portions 23a and 24a (see, for example, FIG. 6). Furthermore, on one side surface of the insulating substrate 22, a side surface portion which surrounds and is slightly than the outer periphery of the detection unit 21 constitutes the detection surface 20.

The sensor element 2 is disposed such that the exhaust gas G which flows into the interior of the inner cover 11 from the inner side holes 11a reaches the side surface on which the detection unit 21 is provided. For example, the side surface provided with the detection unit 21 may be arranged such as to be located on an extension line of a guide body 13 provided on an inner side hole 11a.

As a result, exhaust gas G that flows into the inner cover 11 through an inner side hole 11a opposite the detection surface 20 can easily reach the detection unit 21 on the detection surface 20 without the gas flow being diffused. Hence, a good detection performance can be maintained, with no lowering of the detection sensitivity of the PM sensor S, even at a low flow velocity.

The present disclosure is not limited to the above embodiments, and may be applied to various other embodiments without departing from the gist thereof.

For example, in each of the above embodiments, a PM sensor S having a laminated sensor element 2 has been described as an example, however it would be equally possible to use a printed type of sensor element 2, having the electrodes 23 and 24 printed on the surface that serves as the detection unit 21. In that case, the electrodes 23 and 24 could be formed by printing a comb shape on the surface of an insulating substrate 22 that is formed in a flat plate shape, and the electrodes 23 and 24 could be connected to the terminal electrodes 25 and 26 via lead portions 23a and 24a that are formed by printing on the surface of the insulating substrate 22.

Furthermore, each of the above embodiments has been mainly described as a sensor device which is a PM sensor S, however the invention is not limited to a sensor device that is a PM sensor S, and may be a gas sensor that detects a specific gas component contained in exhaust gas G. Specific examples include an oxygen sensor that detects oxygen in the exhaust gas G, an air-fuel ratio sensor that detects the air-fuel ratio, and an exhaust gas sensor such as a NOx sensor that detects NOx. The sensor element 2 used in these gas sensors may have a known configuration, for example, a detection unit 21 having a detection electrode may be provided at the tip end of a cup-type or laminated type of element.

In each of the above embodiments, the case has been described where the sensor device is applied to the exhaust gas purification system of an automobile engine, however the invention is not limited in application to the internal combustion engine of an automobile, and it would be equally possible for the exhaust gas from various devices to be the gas that is measured. Furthermore, the gas to be measured is not limited to being the exhaust gas from an internal combustion engine, and the invention may be applied to sensor devices for detecting specific components contained in various other gases.

What is claimed is:

1. A sensor device comprising:
   a sensor element having a detector for detecting a specific component in a gas under measurement,
   a housing having the sensor element inserted into the interior thereof, and retained with a detector positioned at a first tip end of the sensor element with respect to the axial direction, and
   an element cover disposed at a first tip end of the housing coaxially,
   with the element cover comprising an inner cover disposed such as to cover the first tip end of the sensor element and an outer cover disposed with a space between the outer cover and the outer periphery of the inner cover, wherein
   an inner side hole and an inner tip surface hole, through which the gas under measurement circulates, are provided in a side surface and a tip surface respectively of the inner cover;
   a plurality of outer side holes, through which the gas under measurement circulates, are provided in a side surface of the outer cover, with tip positions of the outer side holes being located farther toward a first tip end of the sensor device than is a tip position of the inner cover;
   a plurality of outer tip surface holes are provided in a tip surface of the outer cover, located farther radially outward than positions facing the outer periphery of the inner tip surface hole;
   in the tip surface of the outer cover, a central portion, which faces the inner tip surface hole, protrudes towards the inner tip surface hole, an outer peripheral portion, in which the outer tip surface holes are formed, is positioned farther toward the first tip end of the sensor device than is the central portion, and an inclined surface connects the central portion to the outer tip surface holes; and
   the side surface on a tip side of the inner cover is tapered, and on the outer periphery of the side surface on the tip side of the inner cover, a clearance between the inner cover and the outer cover becomes smaller from the tip side toward a base end of the inner cover.

2. The sensor device according to claim 1, wherein
a first flow path having a gas flow direction orthogonal to the axial direction is formed inside the tip surface of the outer cover;
the inner side hole is open to a second flow path that is provided between the outer surface of the inner cover and the inner surface of the outer cover, and
the second flow path includes a large clearance portion having a maximum clearance, at the outer peripheral side of the tip surface of the inner cover, and a small clearance portion, having a minimum clearance, at the base end of the large clearance portion.

3. The sensor device according to claim 2, wherein
the side surface of the inner cover is tapered from the base end thereof, corresponding to the small clearance portion, to the tip end thereof, corresponding to the large clearance portion.

4. The sensor device according to claim 1, wherein
in the outer cover, the central portion of the tip surface of the outer cover is located at the position of the outer peripheral edge of the outer side holes in the tip surface, or farther toward the first tip end of the sensor device than the position of the outer peripheral edge of the outer side holes in the tip surface.

5. The sensor device according to claim 1, wherein
the plurality of outer tip surface holes in the outer cover are evenly arranged in the circumferential direction of the tip surface, and function as drain holes.

6. The sensor device according to claim 1, wherein
the inner cover is provided with a guide body that is inclined and that extends into the interior of the inner cover from the tip edge of the inner side hole of the inner cover.

7. The sensor device according to claim 1, wherein
the gas to be measured is the exhaust gas of an internal combustion engine,
the housing is attached to the exhaust pipe of the internal combustion engine, with the vertical direction as the axial direction of the housing, and
the specific component consists of particulate matter contained in the exhaust gas.

* * * * *